US006439370B1

(12) United States Patent
Hoffman, Jr. et al.

(10) Patent No.: US 6,439,370 B1
(45) Date of Patent: Aug. 27, 2002

(54) METHOD AND APPARATUS FOR THE AUTOMATIC LOADING OF AN ARTICLE ONTO A PRINTING MACHINE

(75) Inventors: Richard C. Hoffman, Jr., Lake Forest; Dariusz Tkacz, Naperville; Roman Guzek, Addison; Boguslaw Biel, Carol Stream; Joel Zupanic, Joliet; Boguslaw Magda, Wheaton, all of IL (US)

(73) Assignee: M&R Printing Equipment, Inc., Glen Ellyn, IL (US)

( * ) Notice: Subject to any disclaimer, the term of this patent is extended or adjusted under 35 U.S.C. 154(b) by 0 days.

(21) Appl. No.: 09/413,001

(22) Filed: Oct. 5, 1999

(51) Int. Cl.[7] ................................................ B65G 47/34

(52) U.S. Cl. ................................. 198/468.2; 198/502.1

(58) Field of Search ........................... 198/464.2, 468.2, 198/468.8, 750.11, 692, 502.1; 101/DIG. 30; 414/795.8, 796.9; 271/10.14, 18.3, 42, 69, 85

(56) References Cited

U.S. PATENT DOCUMENTS

| | | | | | |
|---|---|---|---|---|---|
| 3,120,312 | A | * | 2/1964 | Hudak | 414/795.8 |
| 3,802,548 | A | * | 4/1974 | Wentz et al. | 198/502.1 |
| 3,887,178 | A | * | 6/1975 | Fujimoto | 414/795.8 |
| 4,099,460 | A | | 7/1978 | Bubley et al. | |
| 4,516,762 | A | * | 5/1985 | Moltrasio et al. | 271/18.3 |
| 4,553,662 | A | | 11/1985 | Munch Jensen | |
| 4,875,268 | A | | 10/1989 | Szarka | 29/283 |
| 4,979,868 | A | | 12/1990 | Ueda et al. | |
| 5,015,849 | A | | 5/1991 | Gilpatrick | |
| 5,141,098 | A | * | 8/1992 | Schmale | 198/468.2 |
| 5,421,697 | A | | 6/1995 | Ostwald | |
| 5,575,376 | A | | 11/1996 | Colamussi | |
| 5,595,467 | A | | 1/1997 | Jensen | |
| 5,649,804 | A | | 7/1997 | Schychuck | |
| 5,680,746 | A | | 10/1997 | Hornisch | |
| 5,713,236 | A | | 2/1998 | Genet et al. | |

FOREIGN PATENT DOCUMENTS

| | | | |
|---|---|---|---|
| DE | 88 12 368 | U | 5/1989 |
| DE | 40 18 274 | A1 | 12/1991 |
| EP | 0 097 544 | A | 1/1984 |
| EP | 0 125 316 | A1 | 5/1984 |
| EP | 0 169 477 | A2 | 1/1986 |
| EP | 0 179 010 | A | 4/1986 |
| EP | 0 203 792 | A2 | 12/1986 |
| NL | 6 512 442 | A | 3/1967 |
| WO | WO 99/23021 | | 5/1999 |

* cited by examiner

*Primary Examiner*—Joseph E. Valenza
(74) *Attorney, Agent, or Firm*—Wallenstein & Wagner, Ltd.

(57) ABSTRACT

A new apparatus and methods for automatically loading an article onto a printing surface of a printing machine, and preferably provide a completely reproducible placement of the textile on the printing machine. In accordance with the present invention, the apparatus includes a first support structure having a surface including a first area and a second area, and adapted to support at least one textile thereon. A second support structure is also provided proximate the second area of the first support structure, having a textile lifting mechanism and a textile transfer mechanism. The first support structure in one embodiment is a conveyor table having a primary textile indexing mechanism, such as a laser created line, a vertical stop, or a compact table with angled side edges. The indexing mechanism may be contoured to approximate a periphery of a portion of the textile. Supplemental or secondary indexing mechanisms may also be used, including lasers or the like. The textile lifting mechanism includes at least one adjustable pick-and-place mechanism, which may be either pneumatic, hydraulic, mechanical, or electronic, arranged individually, in pairs, or groups of three or more. Similarly, the textile transfer mechanism includes at least one adjustable pick-and-place mechanism, which may be either pneumatic, hydraulic, mechanical, or electronic, arranged individually, in pairs, or groups of three or more. Preferably, the second support structure is a metal frame and the textile lifting mechanism and the textile transfer mechanism are mounted to the frame.

86 Claims, 3 Drawing Sheets

METHOD AND APPARATUS FOR THE AUTOMATIC LOADING OF AN ARTICLE ONTO A PRINTING MACHINE

TECHNICAL FIELD OF THE INVENTION

The present invention relates to the field of screen printing. Particularly, the present invention relates to an automatic method and apparatus for loading an article onto a printing surface of a printing machine.

BACKGROUND OF THE INVENTION

Printed indicia for applying to items of clothing, such as T-shirts, sweatshirts, golf shirts, shorts, hats, and the like, as well as other cloth and paper goods, such as banners, posters, bags, flags, and the like, have become very popular over the last 20 years. Boutiques specializing in printing fanciful and textual indicia—such as slogans, college names, sport team names and logos, licensed characters, and the like—these various media, are commonly seen in shopping malls across the country. The indicia available at these stores can be pre-printed on a substrate and applied with a heated press by operators at such boutiques to any of the aforementioned items purchased by a consumer or, more commonly, they can be screen printed directly onto the items in mass quantities for later retail sale.

In the screen printing process, a stencil screen is typically blocked (called "masked" in the industry) to embody the desired indicia and is then placed over the item to be printed. Ink of one color is then added to the screen surface and flooded onto the indicia by a flood bar of conventional design. The ink may be of any type well-known in the industry for screen printing. After the ink is flooded onto the screen, the ink is squeegeed through the screen interstices onto the item, leaving ink of the desired color where the interstices in the screen are unblocked. The squeegee can be of any type known in the art. The process may be repeated on each item as many as 16 times using different colors and complementing screens to create just the right design effect. Indexing the screens at each printing station makes this multiple color printing possible.

However, placement of these items onto the printing surface of a printing machine can be a critical factor in quality control. Placement of a screened image, on say a tee-shirt, may typically have only a one-eighth inch tolerance or less in any direction. The tolerance for placement on smaller items may be far less. For this reason, items must be placed with exacting precision onto the printing surface of the printing machine.

Adding to the problem, the printing machine operation may be on as fast as a three-second cycle—meaning an item is printed on every three seconds. In order to keep up with this pace the operator must be very quick to accurately index the printing item on the printing surface. Any mis-timings may cause loss of profit in the form of printing errors, operation shut-down, or, in a worst case scenario, injury to the operator.

Operators may use various indexing mechanisms, including their own hands and fingers, in order to be consistent in their placement—and consistency does not guarantee accuracy. However, the repetitiveness of the movement and tediousness of the work can dull the concentration of the operator, leading to printing mistakes. To safeguard against such mistakes occurring, the operator may be relieved by another operator after a period of time, introducing the probability of a modification to the item placement as no two operators will work exactly the same, or the operation may be shut down for periodic breaks for the operator, delaying operations and increasing costs.

Still, the continuously repetitive motion of the item placement can lead to carpal tunnel syndrome in some persons. Carpal tunnel syndrome is a condition created when the median nerve, traveling through the "tunnel" of the wrist bones, is compressed by the tendons also running through the carpal tunnel. The nerve responds to this compression by sending back pain signals, and by not carrying normal information to provide sensation and motor impulses to the hand.

Carpal tunnel syndrome is common, affecting 0.1% of the general population, and as many as 15% of workers in high-risk industries. The use of highly repetitive wrist movements appears to be correlated with the development of carpal tunnel syndrome, and the incidence rises with increasing repetition of hand use, and by a high level of force with each motion.

Therefore, it is advantageous to automate such a repeatable process. A few reasons for automatically loading an article onto a printing surface of a printing machine are: (1) to allow printing machine operators to concentrate on other areas of printing; (2) to diminish the likelihood of ruining printed articles; (3) to increase the repeatability of the exact placement of loaded articles; and, (4) to reduce the injury risk to printing machine operators.

SUMMARY OF THE INVENTION

In accordance with the present invention, new methods and apparatus for automatically loading a textile onto a printing machine are provided. The apparatus includes a first support structure having a surface including a first area and a second area, and adapted to support at least one textile thereon. A second support structure is also provided proximate the second area of the first support structure, having a textile lifting mechanism and a textile transfer mechanism.

It is therefore an aspect of the present invention to provide an automatic textile loader wherein the first support structure is a conveyor table having a primary textile indexing mechanism, such as a laser created line, a vertical stop, or a compact table with angled side edges. The indexing mechanism may be contoured to approximate a periphery of a portion of the textile. Supplemental or secondary indexing mechanisms may also be used, including lasers or the like.

It is a further aspect of the present invention to provide an automatic textile loader wherein the preferably adjustable conveyor table includes a plurality of continuous moving belts for transporting the textile from the first area to the second area of the support structure surface. The number of belts used may vary widely with the width and length of the conveyor table. The table may include an interrupt device, such as an infrared sensor or mechanical switch, for stopping the movement of the continuous belts.

It is another aspect of the present invention to provide an automatic textile loader wherein the textile lifting mechanism includes at least one adjustable pick-and-place mechanism, preferably either pneumatic, hydraulic, mechanical, or electronic, arranged individually, in pairs, or groups of three or more. Similarly, the textile transfer mechanism includes at least one adjustable pick-and-place mechanism, which may be either pneumatic, hydraulic, mechanical, or electronic, arranged individually, in pairs, or groups of three or more. Preferably, the second support structure is a metal frame and the textile lifting mechanism and the textile transfer mechanism are mounted to the frame.

Another aspect of the present invention is to provide an automatic textile loader having a limit sensor on each of the lifting pick-and-place mechanisms adapted to detect the top of the textile. Also, as part of the lifting pick-and-place mechanisms, a first actuatable extension provides a link for each pick-and-place mechanism to the support structure and a travel path for the pick-and-place mechanism in one direction. A second actuatable extension provides a link for each pick-and-place mechanism to the support structure and a travel path for the pick-and-place mechanism in a second direction. And, a third actuatable extension providing a link for each pick-and-place mechanism to the support structure and a travel path for the pick-and-place mechanism in a third direction.

It is still another aspect of the present invention to provide an automatic textile loader wherein the second support structure includes a track for guiding horizontal movement of the transfer mechanism. The transfer mechanism comprising an adjustable extension for providing a link for each pick-and-place mechanism to the track and a travel path for the pick-and-place mechanism in a first direction. An actuatable extension provides a link for each transfer pick-and-place mechanism to the adjustable extension and a travel path for the pick-and-place mechanism in a second direction.

In a method for automatically loading a textile onto a printing machine, it is an aspect of the present invention to convey a textile along a support surface from a first area on the surface to a second area on the surface, then lift the textile from the second area to an elevated position, then transfer the textile from the elevated position to a printing machine.

It is an aspect of the present method to provide a reproducible placement of the textile on the printing machine. It is therefore as aspect to index the textile at the first area of the surface. In the method for automatically loading a textile, it is an aspect of the present invention to index the textile by providing a mark at the first area of the support surface, and then lining the textile up on the support surface with the mark.

These and other aspects of the present invention set forth in the appended claims may be realized in accordance with the following disclosure with particular reference to the accompanying drawings.

DESCRIPTION OF THE DRAWINGS

To understand the present invention, it will now be described by way of example, with reference to the accompanying drawings in which.

DETAILED DESCRIPTION OF THE PREFERRED EMBODIMENT

While the invention is susceptible of embodiment in many different forms, this disclosure describes, in detail, preferred embodiments of the invention with the understanding that the present disclosure is to be considered as an exemplification of the principles of the invention and is not intended to limit the broad aspects of the invention to the embodiments illustrated.

Referring generally to the appended FIGS. 1–5, the process of loading a textile onto a screen printing machine using the present invention can be more readily understood. The disclosed automatic loader is generally referenced by the number "10" in the following disclosure and drawings. Other components are similarly and consistently numbered throughout the specification and drawings. While the present invention is particularly designed for use with automatic rotary and oval printing machines, such as, for example, the CHALLENGER™ and the GAUNTLET™, and their progeny, manufactured by M&R Printing Equipment, Inc. of Glen Ellyn, Ill., other such automatic printing systems may be capable of adaptation for implementation of the system as well.

Figure 1:
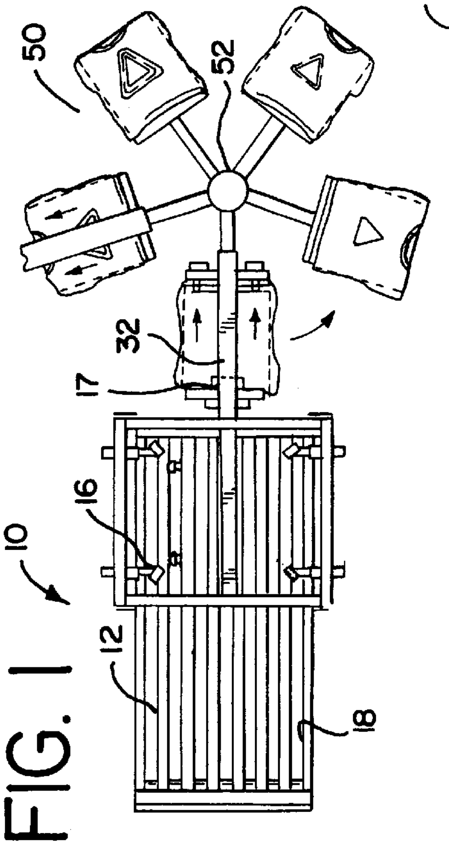
FIG. 1 is a top view of an automatic textile loader aligned with a five station printing machine illustrating the relative positioning of an embodiment of the present invention to the printing machine.

As shown in FIG. 1, the present automatic loader 10 is generally aligned to a printing machine 50 at the first printing station. The first printing station is defined as the station of the printing machine 50 receiving the textile onto the corresponding platen and used for printing, drying, or any other purpose which is cooperative with the loading of articles. With respect to existing printing machines, it is not necessary to create the loading (or first) station since machines are typically provided with such stations for manual loading operations. The automatic loader 10 of the present invention merely replaces the necessity for manual loading. In this way, the usual operation of the printing machine 50—rotating the platen carousel 52 in a clockwise or counter-clockwise fashion from a first to a last printing station—need not be changed. The present invention can be readily retrofit to such existing printing machines, as will be understood from the following disclosure.

The automatic loader 10, as shown in FIG. 1, is used to load an article 20 onto a printing surface, or a pallet of a printing machine. In a preferred embodiment, referring to FIG. 2, the loader 10 includes a first support structure 11 having a surface 12 with a first area 13 and a second area 14. The surface 12 is adapted to support at least one article thereon. Referring to FIG. 3, a second support structure 15 is situated proximate the second area 14 of the first support structure 11 and includes a textile lifting mechanism 16 and a textile transfer mechanism 17.

In a preferred embodiment, the first support structure 11 is shown to be a conveyor table 18. The conveyor table 18 is equipped with a plurality of continuous belts 19 passing from one end of the table 18 over a smooth table surface 12 to the opposite end of the table 18, and returning again from below the surface 12. The belts 19 may be driven by a conventional servo motor adequate for the purposes of the present invention. The number and size of the belts used depends on the length and width of the conveyor table 18.

Figure 2:
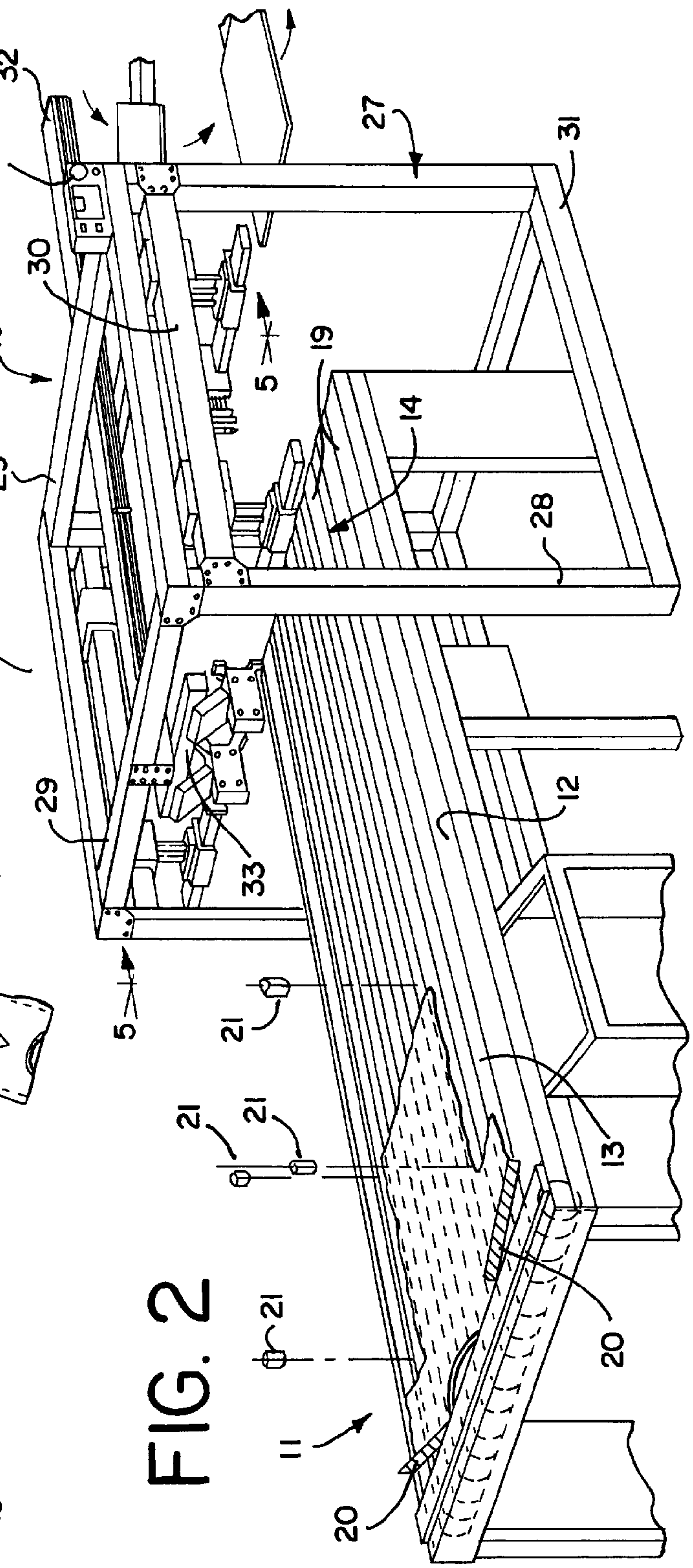
FIG. 2 is a side perspective view of one embodiment of the present invention.
Figure 3:
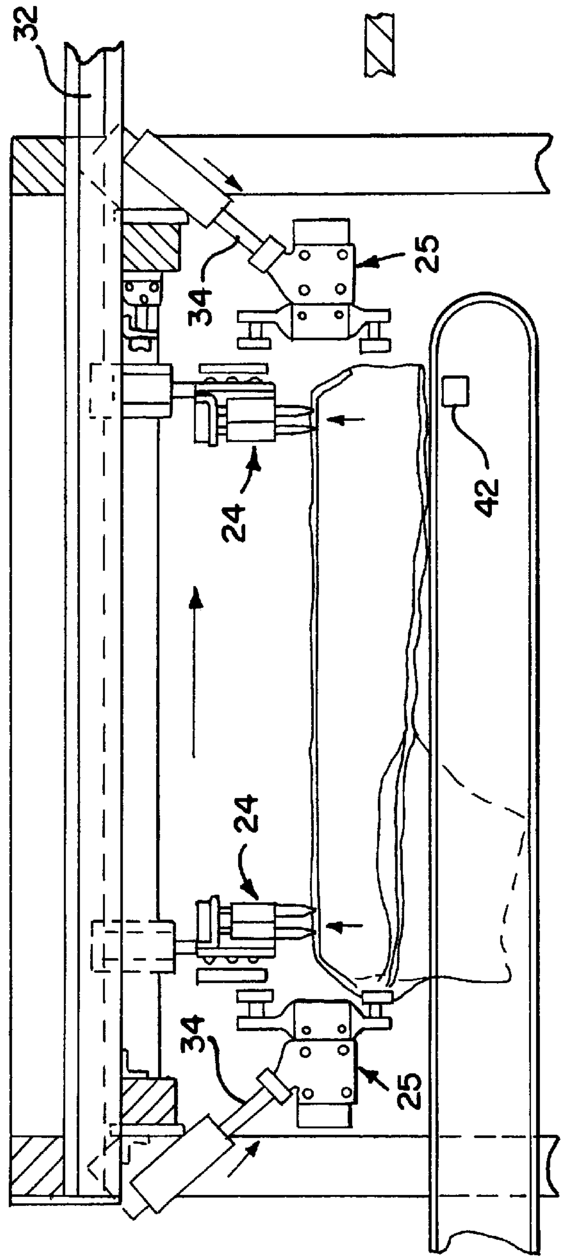
FIG. 3 is an elevated side view of a fragment of the present invention illustrating one embodiment of the pick-and-place mechanisms of the lifting and transfer mechanisms as they operate together.

At a first area 13 of the conveyor table 18 a primary textile indexing mechanism is shown in FIG. 2. The primary textile indexing mechanism is preferably a substantially vertical stop 20. The vertical stop 20 is a short plastic or metal wall, called "wings" in the industry, and may be contoured to approximate a portion of the article, such as the top of a shirt. Additionally, the automatic textile loader 10 may also comprise a secondary textile indexing mechanism. The secondary textile indexing mechanism may be at least one laser 21, preferably at least two lasers, and most preferably about four lasers 21, each mounted above the first area 13 of the conveyor table 18, as shown in FIG. 2.

The laser or lasers 21 may be employed in a variety of ways to index the article to be loaded onto the printing machine 50. One possible configuration is to index the centerline of the article with a laser. For example, approximately 60% of all shirts packaged for printing have what is known in the industry as a "printer fold" running down the centerline of the shirt. A laser line would provide an adequate indexing mechanism to align with the "printer fold." Alternatively, or additionally, laser lines or points may be directed at the surface of the conveyor table 18 to outline the periphery of the article or index any number of specific points on the textile. This process of indexing is well understood by those skilled in the relevant art.

Figure 6:
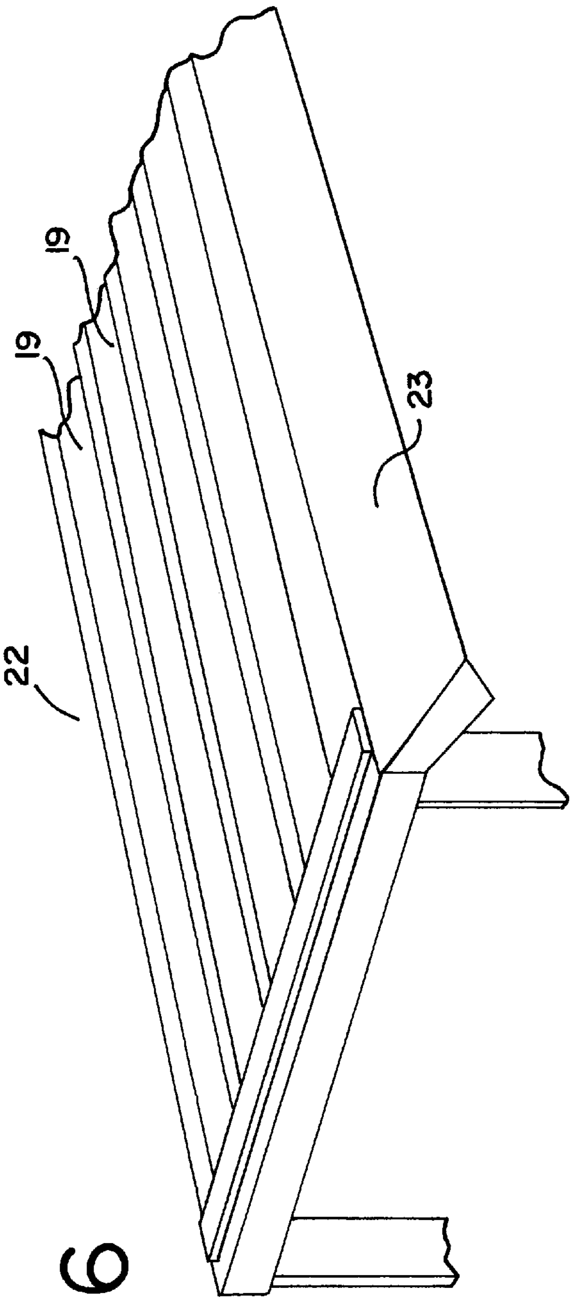

Another indexing possibility utilizes a surface known in the industry as a compact table 22, shown in FIG. 6. The compact table 22 has at least one side surface 23 projecting at a downward angle. This configuration allows a shirt to be aligned with the downwardly angled surface 23 or surfaces. Secondary indexing mechanisms, as previously discussed, may also be used with a compact table 22. The conventional conveyor table 18 or compact table 22 may be adjustable as well.

With respect to the second support structure 15, referring to FIG. 2, the textile lifting mechanism 16 and the textile transfer mechanism 17 both comprise at least one pick-and-place mechanism 24 and 25, respectively. The operation of these various mechanisms is operated and controlled by a conventional programmable controller 26. This includes actuation, extension, and travel of each pick-and-place mechanism, as well as operation of the conveyor table 18.

Generally speaking, a pick-and-place mechanism requires a moving member and a gripping member that may automatically extend so that it surrounds the article and then grips the article. Once the article has been engaged, the moving member is then retracted so that the article is taken out of its previous environment. When the article has been removed from the environment sufficiently so that it may be moved without interference with other components, a different motion is then usually applied to the article by the pick-and-place mechanism, usually a horizontal motion. This moves the article from one location to another. When the article has arrived at the new location, the moving member must then extend to place the article in its new location, at which point the grippers release the article and the moving member is retracted.

The activation of actuators of the pick-and-place mechanisms are usually comprised of air cylinders or fluidized cylinders, although electrical actuators may also be used. In general, the actuators are unidirectional in that they reciprocally extend and retreat in a linear fashion upon energization. There are, however, pick-and-place mechanisms on the market that use multiple linear actuators, one for each direction of travel that may be required for the pick-and-place carriage. In the usual case, a first reciprocal linear horizontal motion is required on the gripper arm, and a separate air cylinder provides that reciprocal motion.

The goal of any pick-and-place mechanism is to make its operation as simple as possible while also maximizing the repeatability of its operation. For this reason, the preciseness of the location of the article of the pick up and delivery points is also important in these machines along with their reliability.

Referring to FIG. 2, it can be seen that the second support structure 15 is basically a metal frame structure 27 having four vertical supports 28, four horizontal supports 29 attached to and connecting top ends of the vertical supports 28, three horizontal mechanism supports 30, and three horizontal bottom supports 31 attached to and connecting bottom ends of the vertical supports 28. The lifting mechanisms 16 and transfer mechanisms 17 of the present invention are mounted to the frame 27.

Figure 4:
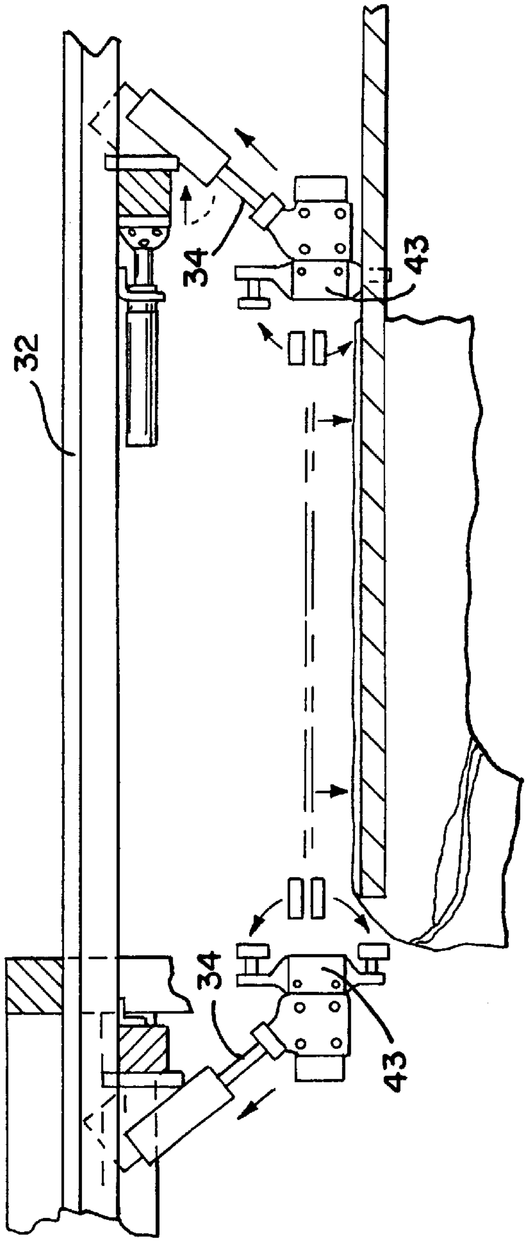
FIG. 4 is another elevated side view of one embodiment of the transfer pick-and-place mechanisms illustrating the placement of an article onto a printing machine platen.

Mounted to the underside of two opposite vertical supports 28 is a guide track 32. The pick-and-place mechanisms 25 of the transfer mechanism 17 travel horizontally via the guide track 32. Two extension bars 33 are coupled in a conventional manner to a continuous drive belt (not shown) within the guide track 32. Mounted proximate each end of the extension bars 33 are the transfer pick-and-place (tpp) mechanisms 25. As shown in FIG. 3, each tpp mechanisms 25 preferably faces and is in alignment with another tpp mechanism 25. The tpp mechanisms 25 should be capable of gripping an article on a horizontal plane, as shown in FIG. 4. Additionally, the tpp mechanisms 25 should be capable of actuatable extension toward a center point of the article. The tpp mechanisms 25 shown extend at a downward angle via extension rod 34. The guide track 32 is designed to extend beyond the frame structure 27 a distance to allow travel of the tpp mechanisms 25 to a position over the printing machine platen, as shown in FIG. 1.

Figure 5:
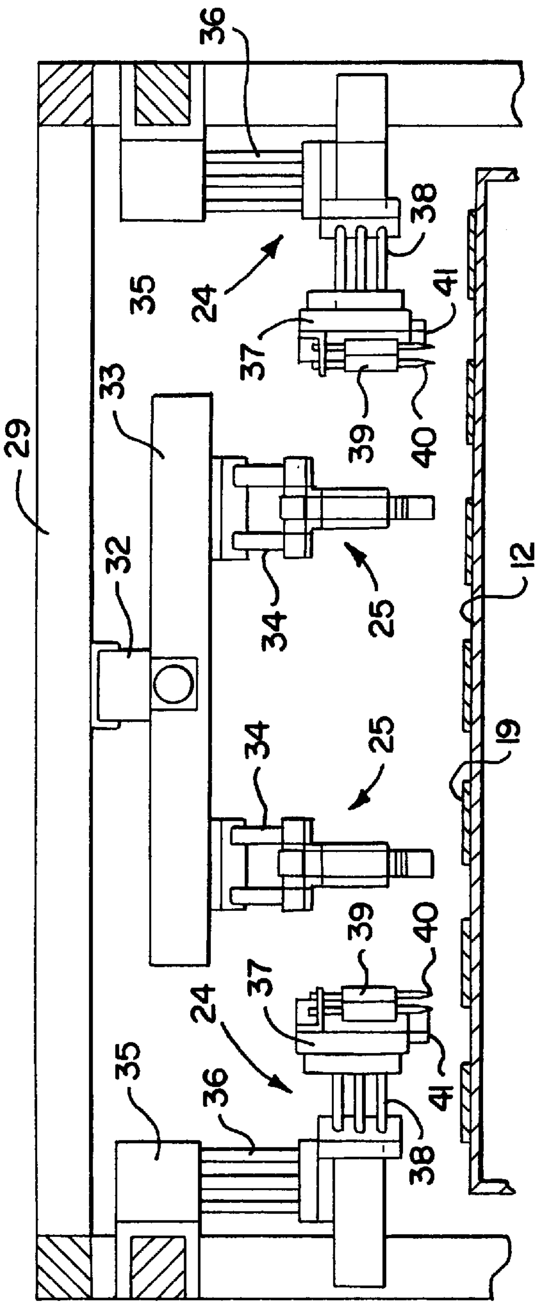
FIG. 5 is an elevated front view of one embodiment of the lifting pick-and-place mechanisms and the transfer pick-and-place mechanisms illustrating the relative positions of each to the other and to the conveyor table; and, FIG. 6 is a perspective view of a compact table for use as an indexing mechanism with the present invention.

The lifting pick-and-place (lpp) mechanisms 24 are preferably affixed to the side horizontal supports 30 of the frame 27, as shown in FIG. 5. The lpp mechanisms 24 preferably. are capable of extension downward at the base 35 via extension rods 36 and at the sliding head 37 of the lpp mechanism 24. Additionally, the lpp mechanisms 24 should be extendable in a horizontal plane, as shown in FIG. 5, via extension rods 38. In a preferred embodiment, the extension rods 38 permit the extension of the head 37 of the lpp mechanism 24 diagonally toward the centerline of the article. The gripping mechanism 39 of the lpp mechanisms 24 should be downward facing in order to grab a top layer of material from a stack of indexed articles. The gripping mechanisms 39 are paired up at each lpp mechanism 24 to provide redundancy, however, it may be possible to utilize a single gripping mechanism 39 at each lpp mechanism 24. The gripping mechanisms 39 of the lpp mechanisms 24 should have tips 40 designed for delicate gripping, if possible.

Because articles are never exactly the same thickness, and because stacking of articles at the indexing area insures that the articles will be progressively lower as each article is removed from the stack, a limit sensor 41 may be used in cooperation with the lpp mechanisms 24. Each one may be controlled separately since variations in height may exist from one side of an article to the other. The limit sensor 41 is conventional, and known by those skilled in the art, and operates by detecting contact with the upper surface of the article. The detection of the upper surface sends a signal to the controller 26 to energize the appropriate actuator to close the gripping mechanism 39 of the respective lpp mechanism 24. There are preferably four lpp mechanisms 24 used for lifting the article from either the conveyor table 18 or from a stack of articles (not shown).

The lpp mechanisms 24, unlike the tpp mechanisms 25, are not capable of horizontal travel along a guide track. The vertical travel of extension rods 38 serves to draw the printing surface of each article taut to insure a smooth surface is placed onto the printing platen.

An interrupt sensor 42 may be positioned below the surface of the conveyor table 18 to terminate travel of the belts 19, and thereby terminate transport of the articles (stacked or individually) from the first area 13 of the support structure 11 to the second area 14. Much like the operation of a grocery store check-out conveyor, when the interrupt sensor 42 is covered by an article it sends a signal to the controller 26 to terminate the power to the drive motor (not shown) of the conveyor table 18. As soon as the last article is lifted by the lpp mechanisms 24, the sensor 42 is uncovered and the power supply is reestablished to the drive motor. The interrupt sensor 42 may be a conventional light beam or, alternatively, a mechanical switch sensitive enough to be activated by a single article. Such sensors and switches are known and understood by those skilled in the art.

The lpp mechanisms 24 and the tpp mechanisms 25 cooperate, via the controller 26 and sensors (not shown) to signal the status and position of each mechanism during operation. The lpp mechanisms 24 are capable of numerous travel paths, including: (1) raised and lowered positions via extension rods 36 and sliding head 37; (2) extended and retracted positions via a second set of extension rods 38; and, (3) open and closed positions via the lpp gripping mechanism 39. Similarly, the tpp mechanisms 25 are also capable of varied travel paths, including: (1) extended and retracted positions via extension rods 34; and, (2) open and closed positions via the tpp gripping mechanisms 43. To the extent other pick-and-place mechanisms are capable of performing the coordinated tasks of the preferred mechanisms, they may provide suitable alternatives for the present invention. Pneumatic actuation of the lpp and tpp mechanisms, 24 and 25, respectively, is preferred. Naturally, hydraulic, electric, and manual actuation may also be possible.

TABLE 1 sets forth a step-by-step operation for lifting and transferring an article from a conveyor surface to a printing surface.

TABLE 1

Cooperation Between Pick-and-Place Mechanisms

| STEP | Pre transfer position[1] of Article | Position of lifting pick-and-place mechanism | Position of transfer pick-and-place mechanism | Post transfer position[1] of Article |
|---|---|---|---|---|
| 1 | Area 1 | Raised[2], Retracted[3], Open[4] | Retracted[3], Open[4] | |
| 2 | Area 2 | Lowered, Extended, Open | Retracted, Open | |
| 3 | Area 2 | Lowered, Extended, Closed | Retracted, Open | |
| 4 | Lifted | Raised, Extended, Closed | Retracted, Open | |
| 5 | Stretched | Raised, Retracted, Closed | Extended, Open | |
| 6 | Transfer | Raised, Retracted Open | Extended, Closed | Area 2 → Platen |
| 7 | | Lowered, Extended, Open | Retracted, Closed | Platen |
| 8 | | Lowered, Extended, Closed | Extended, Open | Platen |
| 9 | Repeat steps 4 through 8 until all articles have been lifted and transferred to platen | | | |

1 - Step 6 of operation
2 - Raised/Lowered: position of mechanism relative to support surface;
3 - Extended/Retracted: position of mechanism relative to center-point of article;
4 - Closed/Open: position of gripping mechanism of Pick-and-place.

TABLE 1 clearly illustrates the cooperation necessary between the lpp mechanisms 24 and the tpp mechanisms 25. Preferably, each mechanism is responsive to the other through operation of the integral controller 26.

The method for for automatically loading a textile onto a printing machine is more easily understood with reference to FIGS. 2–5.

The process begins with the article, shown as a short-sleeved shirt, being indexed at the first area 13 of the support surface, e.g. a conveyor table 18. Several shirts may be indexed onto one another to create a stack of indexed shirts. The first stack, or individual shirt, if desired, is advanced to make room for another stack to be indexed. The indexing is typically performed by an operator who aligns the shirt with either a physical mark or edge, such as vertical stop 20 or a compact table 22 (FIG. 6). Alternatively, or in addition, the shirt may be indexed using lasers 21, aligning a common feature of the shirt, such as a shirt sleeve, printer fold, periphery, etc., with a laser line. Other indexing mechanisms are certainly possible, depending on the type of article being indexed for printing.

The stacked shirts are conveyed along the support surface by the continuous belt conveyor 18 from the first area 13 to, ultimately, the second area 14. An interrupt device 42 is used to detect the proper position of the stack and terminate the operation of the conveyor 18. The second area 14 is immediately below the second support structure 15. From this position the lpp mechanisms 24 are actuated by the controller 26 to lower. A limit sensor 41 mounted to the lpp mechanisms 24 detects the top surface of the stack. The lpp gripping mechanism 39 closes on each lpp mechanism 24, thereby pinching the top layer of the first shirt. As soon as the lpp gripping mechanisms 39 are closed, the lpp mechanisms 24 are raised and retracted, lifting the first shirt from the stack and stretching it slightly, as shown in FIG. 3.

The lifting action triggers the actuation of the tpp mechanisms 25. The tpp mechanism 25 extends in an open position. The tpp gripping mechanisms 43 then close to grip the raised shirt. Immediately thereafter the lpp gripping mechanisms 39 open to release the shirt, and extend and lower to lift the next shirt. Simultaneously, the tpp mechanism 25 retracts (not necessarily all the way) to maintain the tautness of the printing area of the shirt and begins horizontal travel by the operation of the belt within the guide track 32. A small puff of air directed to the open body portion of the shirt expands the shirt to ease engagement with the printing machine platen.

The open shirt is then placed onto the printing machine platen, as shown in FIG. 4, by extending the tpp mechanism 25 and opening the tpp gripping mechanism 43. The tpp mechanism 25 may then return to engage a second shirt, and the process is repeated until all shirts have been transferred to the printing machine.

While specific embodiments have been illustrated and described, numerous modifications are possible without departing from the spirit of the invention, and the scope of protection is only limited by the scope of the accompanying claims.

We claim:

1. An automatic textile loader comprising:

a first support structure having a surface including a first area and a second area, and adapted to support at least one textile thereon, wherein the first area comprises a primary textile positioning mechanism;

a second support structure, proximate the second area of the first support structure, having a textile lifting mechanism comprised of at least one pick and place mechanism and a textile transfer mechanism that transports the textile to a working surface; wherein the first support structure, the textile lifting mechanism and the textile transfer mechanism cooperatively operate to repeatably align the textile on the working surface for further processing; and a secondary textile positioning mechanism comprising at least one laser, wherein the at least one laser positions at the approximate centerline of the textile.

2. The automatic textile loader of claim 1 wherein the first support structure is a conveyor table.

3. The automatic textile loader of claim 1 wherein the primary textile positioning mechanism is a substantially vertical stop.

4. The automatic textile loader of claim 3 wherein the substantially vertical stop is contoured to approximate a portion of the textile.

5. The automatic textile loader of claim 1 wherein the at least one laser positions at least two points on the textile.

6. The automatic textile loader of claim 1 wherein the at least one laser positions at least a portion of the periphery of the textile.

7. An automatic textile loader for a printing machine comprising:

a first support structure having a surface including a first area and a second area, and adapted to support at least one textile thereon, wherein the first area comprises a primary textile positioning mechanism; and a second support structure, proximate the second area of the first support structure, having a textile lifting mechanism comprised of at least one pick and place device and a textile transfer mechanism that transports the textile to a working surface; wherein the first support structure, the textile lifting mechanism and the textile transfer mechanism cooperatively operate to repeatably align the textile on the working surface for further processing, and wherein the primary indexing mechanism comprises a compact table having a downwardly angled surface along each of two opposing edges.

8. The automatic textile loader of claim 7 further comprising a secondary textile positioning mechanism.

9. The automatic textile loader of claim 8 wherein the secondary textile positioning mechanism comprises at least one laser.

10. The automatic textile loader of claim 9 wherein the at least one laser positions at the approximate centerline of the textile.

11. The automatic textile loader of claim 9 wherein the at least one laser positions at least two points on the textile.

12. The automatic textile loader of claim 9 wherein the at least one laser positions at least a portion of the periphery of the textile.

13. The automatic textile loader of claim 2 wherein the conveyor table includes a plurality of continuous moving belts for transporting the textile from the first area to the second area.

14. The automatic textile loader of claim 13 wherein the second area of the first support includes an interrupt device for stopping the movement of the continuous belts.

15. The automatic textile loader of claim 14 wherein the interrupt device is an infrared sensor.

16. The automatic textile loader of claim 14 wherein the interrupt device is a mechanical switch.

17. The automatic textile loader of claim 14 wherein the interrupt device is mounted below the surface of the first support structure.

18. The automatic textile loader of claim 1 wherein the textile lifting mechanism comprises at least one pick-and-place mechanism.

19. The automatic textile loader of claim 1 wherein the second support structure is a metal frame, and wherein the textile lifting mechanism and the textile transfer mechanism are mounted to the frame.

20. The automatic textile loader of claim 19 wherein the textile lifting mechanism comprises at least one pick-and-place mechanism.

21. The automatic textile loader of claim 20 wherein the at least one pick-and-place mechanism is pneumatic.

22. The automatic textile loader of claim 20 wherein the at least one pick-and-place mechanism is hydraulic.

23. The automatic textile loader of claim 20 wherein the at least one pick-and-place mechanism is electronic.

24. The automatic textile loader of claim 20 wherein the at least one pick-and-place mechanism is mechanical.

25. The automatic textile loader of claim 20 the textile lifting mechanism further comprises a limit sensor proximate a gripping member of the pick-and-place mechanisms adapted to detect the top of the textile.

26. The automatic textile loader of claim 20 wherein the textile lifting mechanism comprises two sets of pick-and-place mechanisms.

27. The automatic textile loader of claim 20 wherein the textile lifting mechanism comprises four pair of pick-and-place mechanisms.

28. The automatic textile loader of claim 20 wherein the textile lifting mechanism comprises four pick-and-place mechanisms.

29. The automatic textile loader of claim 20 wherein the at least one pick-and-place mechanism is vertically adjustable.

30. The automatic textile loader of claim 25 the textile lifting mechanism further comprises a first actuatable extension providing a link for each pick-and-place mechanism to the support structure and a travel path for the pick-and-place mechanism in one direction.

31. The automatic textile loader of claim 30 the textile lifting mechanism further comprising a second actuatable extension providing a link for each pick-and-place mechanism to the support structure and a travel path for the pick-and-place mechanism in a second direction.

32. The automatic textile loader of claim 31 the textile lifting mechanism further comprising a third actuatable extension providing a link for each pick-and-place mechanism to the support structure and a travel path for the pick-and-place mechanism in a third direction.

33. The automatic textile loader of claim 18 the textile lifting mechanism further comprising a first actuatable extension providing a link for each pick-and-place mechanism to the support structure and a travel path for the pick-and-place mechanism in one direction.

34. The automatic textile loader of claim 33 the textile lifting mechanism further comprising a second actuatable extension providing a link for each pick-and-place mechanism to the support structure and a travel path for the pick-and-place mechanism in a second direction.

35. The automatic textile loader of claim 34 the textile lifting mechanism further comprising a third actuatable extension providing a link for each pick-and-place mechanism to the support structure and a travel path for the pick-and-place mechanism in a third direction.

36. The automatic textile loader of claim 19 wherein the second support structure includes a track for guiding horizontal movement of the transfer mechanism.

37. The automatic textile loader of claim 36 wherein the textile transfer mechanism operates in cooperation with the textile lifting mechanism.

38. The automatic textile loader of claim 19 wherein the textile transfer mechanism is responsive to the textile lifting mechanism.

39. The automatic textile loader of claim 36 wherein the textile transfer mechanism comprises two sets of pick-and-place mechanisms.

40. The automatic textile loader of claim 36 wherein the textile transfer mechanism comprises four pair of pick-and-place mechanisms.

41. The automatic textile loader of claim 36 wherein the textile transfer mechanism comprises four pick-and-place mechanisms.

42. The automatic textile loader of claim 36 wherein the at least one pick-and-place mechanism is vertically adjustable.

43. The automatic textile loader of claim 42 the textile transfer mechanism further comprising an adjustable extension providing a link for each pick-and-place mechanism to the track and a travel path for the pick-and-place mechanism in a first direction.

44. The automatic textile loader of claim 43 the textile transfer mechanism further comprises an actuatable extension providing a link for each pick-and-place mechanism to the adjustable extension and a travel path for the pick-and-place mechanism in second direction.

45. The automatic textile loader of claim 19 the textile transfer mechanism further comprising an adjustable extension providing a link for each pick-and-place mechanism to the support structure and a travel path for the pick-and-place mechanism in one direction.

46. The automatic textile loader of claim 45 the textile transfer mechanism further comprising an actuatable extension providing a link for each pick-and-place mechanism to the adjustable extension and a travel path for the pick-and-place mechanism in a second direction.

47. An automatic textile loader comprising:

a textile conveying table having a first end, a second end, and means for moving a textile from an area proximate the first end to an area proximate the second end, the first end comprising a primary textile positioning mechanism and a secondary textile positioning mechanism wherein the secondary textile positioning mechanism comprises at least one laser to position the approximate centerline of the textile;

a lifting mechanism, comprised of at least one pick and place mechanism, for moving the textile from the area proximate the second end to an elevated position; and a transfer mechanism for moving the textile from the elevated position to a working surface; wherein the first support structure, the textile lifting mechanism and the textile transfer mechanism cooperatively operate to repeatably align the textile on the working surface for further processing.

48. The automatic textile loader of claim 47 further comprising a positioning mechanism operative at the first end of the textile conveying table.

49. The automatic textile loader of claim 48 wherein the positioning mechanism includes a substantially vertical stop.

50. The automatic textile loader of claim 48 wherein the positioning mechanism includes at least one laser.

51. The automatic textile loader of claim 49 wherein the positioning mechanism includes at least one laser.

52. The automatic textile loader of claim 48 wherein the positioning mechanism includes a compact table.

53. The automatic textile loader of claim 52 wherein the compact table has a downwardly angled, surface along at least one side edge.

54. The automatic textile loader of claim 47 wherein the means for moving comprises a belt conveyor.

55. The automatic textile loader of claim 47 wherein the textile lifting mechanism comprises at least one pick-and-place mechanism.

56. The automatic textile loader of claim 47 wherein the second support structure is a metal frame, and wherein the textile lifting mechanism and the textile transfer mechanism are mounted to the frame.

57. The automatic textile loader of claim 56 wherein the textile lifting mechanism comprises at least one pick-and-place mechanism.

58. The automatic textile loader of claim 57 wherein the at least one pick-and-place mechanism is pneumatic.

59. The automatic textile loader of claim 57 wherein the at least one pick-and-place mechanism is hydraulic.

60. The automatic textile loader of claim 57 wherein the at least one pick-and-place mechanism is electronic.

61. The automatic textile loader of claim 57 wherein the at least one pick-and-place mechanism is mechanical.

62. The automatic textile loader of claim 57 the textile lifting mechanism further comprises a limit sensor proximate a gripping member of the pick-and-place mechanisms adapted to detect the top of the textile.

63. The automatic textile loader of claim 57 wherein the textile lifting mechanism comprises two sets of pick-and-place mechanisms.

64. The automatic textile loader of claim 57 wherein the textile lifting mechanism comprises four pair of pick-and-place mechanisms.

65. The automatic textile loader of claim 57 wherein the textile lifting mechanism comprises four pick-and-place mechanisms.

66. The automatic textile loader of claim 57 wherein the at least one pick-and-place mechanism is vertically adjustable.

67. The automatic textile loader of claim 62 the textile lifting mechanism further comprises a first actuatable extension providing a link between each pick-and-place mechanism to the frame and a travel path for the pick-and-place mechanism in one direction.

68. The automatic textile loader of claim 67 the textile lifting mechanism further comprising a second actuatable extension providing a link between each pick-and-place mechanism to the frame and a travel path for the pick-and-place mechanism in a second direction.

69. The automatic textile loader of claim 68 the textile lifting mechanism further comprising a third actuatable extension providing a link between each pick-and-place mechanism to the frame and a travel path for the pick-and-place mechanism in a third direction.

70. The automatic textile loader of claim 57 the textile lifting mechanism further comprising a first actuatable extension providing a link between each pick-and-place mechanism to the frame and a travel path for the pick-and-place mechanism in one direction.

71. The automatic textile loader of claim 70 the textile lifting mechanism further comprising a second actuatable extension providing a link between each pick-and-place mechanism to the frame and a travel path for the pick-and-place mechanism in a second direction.

72. The automatic textile loader of claim 71 the textile lifting mechanism further comprising a third actuatable extension providing a link between each pick-and-place mechanism to the frame and a travel path for the pick-and-place mechanism in a third direction.

73. The automatic textile loader of claim 47 further comprising a track for guiding horizontal movement of the transfer mechanism.

74. The automatic textile loader of claim 73 wherein the textile transfer mechanism operates in cooperation with the textile lifting mechanism.

75. The automatic textile loader of claim 47 wherein the textile transfer mechanism is responsive to the textile lifting mechanism.

76. The automatic textile loader of claim 47 wherein the textile transfer mechanism comprises at least one pick-and-place mechanism.

77. The automatic textile loader of claim 73 wherein the textile transfer mechanism comprises at least one pick-and-place mechanism.

78. The automatic textile loader of claim 73 wherein the textile transfer mechanism comprises two sets of pick-and-place mechanisms.

79. The automatic textile loader of claim 73 wherein the textile transfer mechanism comprises four pair of pick-and-place mechanisms.

80. The automatic textile loader of claim 73 wherein the textile transfer mechanism comprises four pick-and-place mechanisms.

81. The automatic textile loader of claim 77 wherein the at least one pick-and-place mechanism is vertically adjustable.

82. The automatic textile loader of claim 81 the textile transfer mechanism further comprising an adjustable extension providing a link for each pick-and-place mechanism to the track and a travel path for the pick-and-place mechanism in a first direction.

83. The automatic textile loader of claim 82 the textile transfer mechanism further comprises an actuatable extension providing a link for each pick-and-place mechanism to the adjustable extension and a travel path for the pick-and-place mechanism in second direction.

84. The automatic textile loader of claim 47 the textile transfer mechanism further comprising an adjustable extension providing a link for each pick-and-place mechanism to the track and a travel path for the pick-and-place mechanism in one direction.

85. The automatic textile loader of claim 84 the textile transfer mechanism further comprising an actuatable extension providing a link for each pick-and-place mechanism to the adjustable extension and a travel path for the pick-and-place mechanism in a second direction.

86. The automated textile loader of claim 71 wherein each of two opposing edges of the table are downwardly angled.

* * * * *

UNITED STATES PATENT AND TRADEMARK OFFICE

CERTIFICATE OF CORRECTION

PATENT NO. : 6,439,370 B1
DATED : August 27, 2002

INVENTOR(S) : Richard C. Hoffman, Jr. et al.

It is certified that error appears in the above-identified patent and that said Letters Patent is hereby corrected as shown below:

<u>Column 3,</u>
Line 32, delete "as" and insert the word -- an -- therefor

<u>Column 8,</u>
Line 1, delete the second "for" so that the sentence begins "The method for automatically..."
Line 64, delete "mechanism and a textile transfer mechanism" and insert -- device and a textile transfer mechanism -- therefor <u>Column 10,</u>
Lines 17 and 33, delete "comprises" and insert the word -- comprising -- therefor <u>Column 11,</u>
Line 22, delete "comprises" and insert the word -- comprising -- therefor <u>Column 12,</u>
Lines 21 and 36, delete "comprises" and insert the word -- comprising -- therefor <u>Column 14,</u>
Lines 7 and 21, delete "comprises" and insert the word -- comprising -- therefor Signed and Sealed this First Day of April, 2003

JAMES E. ROGAN
*Director of the United States Patent and Trademark Office*